United States Patent
Parekh et al.

(10) Patent No.: US 10,756,834 B2
(45) Date of Patent: Aug. 25, 2020

(54) AUTOMATIC OPTIMIZATION OF VEHICLE RF AUDIO SYSTEMS

(71) Applicant: TOYOTA MOTOR NORTH AMERICA, INC., Plano, TX (US)

(72) Inventors: Devang Parekh, Plano, TX (US); Louis Brugman, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/243,411

(22) Filed: Jan. 9, 2019

(65) Prior Publication Data

US 2020/0220633 A1  Jul. 9, 2020

(51) Int. Cl.
| | |
|---|---|
| *H04H 20/71* | (2008.01) |
| *H04W 4/029* | (2018.01) |
| *H04H 60/32* | (2008.01) |
| *H04W 4/40* | (2018.01) |
| *H04H 60/33* | (2008.01) |

(52) U.S. Cl.
CPC ............ *H04H 20/71* (2013.01); *H04H 60/32* (2013.01); *H04W 4/029* (2018.02); *H04W 4/40* (2018.02); *H04H 60/33* (2013.01)

(58) Field of Classification Search
CPC ........ H04H 20/62; H04H 60/85; H04H 20/71; H04W 4/029
USPC ........................ 455/569.1, 569.2, 67.11, 90.1
See application file for complete search history.

(56) References Cited

U.S. PATENT DOCUMENTS

| | | | |
|---|---|---|---|
| 7,373,152 B2 | 5/2008 | Oesterling | |
| 8,160,571 B2 | 4/2012 | Griff | |
| 9,565,625 B1 | 2/2017 | Macneille | |
| 10,011,156 B2 | 7/2018 | Lee | |
| 2005/0179531 A1* | 8/2005 | Tabe | B60C 23/0408 340/447 |
| 2007/0016342 A1* | 1/2007 | Allen | H04L 67/125 701/2 |
| 2014/0093107 A1* | 4/2014 | Vu | B60J 7/043 381/302 |
| 2014/0336875 A1* | 11/2014 | Sigal | H04H 60/85 701/36 |

* cited by examiner

*Primary Examiner* — John J Lee
(74) *Attorney, Agent, or Firm* — Sheppard, Mullin, Richter & Hampton LLP; Hector A. Agdeppa; Daniel N. Yannuzzi

(57) ABSTRACT

A system and method are provided for automatic optimization of vehicle RF audio systems. The method includes receiving first data describing a radio-frequency environment experienced by a radio system of a vehicle, the vehicle radio system comprising a processor and a memory storing code executable by the processor; receiving second data describing responses of one or more occupants of the vehicle to audio produced by the radio system; correlating the responses of one or more occupants of the vehicle with changes in the radio-frequency environment experienced by the radio system; generating a code update using the correlation of the responses with changes in the radio-frequency environment experienced by the radio system, and refreshing code stored in a memory of the vehicle according to the code update, wherein a processor in the vehicle executes the code.

20 Claims, 5 Drawing Sheets

AUTOMATIC OPTIMIZATION OF VEHICLE RF AUDIO SYSTEMS

TECHNICAL FIELD

The present disclosure relates generally to vehicles. In particular, embodiments of the present disclosure relate to vehicle radio systems, including radios and antennas.

DESCRIPTION OF RELATED ART

Vehicle radios and antennas are designed and tuned to suit customer preferences. These preferences are generally collected by customer surveys. However, these surveys are conducted infrequently, and many customers do not complete the surveys. Consequently, the design and tuning of the vehicle radios and antennas may not please the majority of customers.

BRIEF SUMMARY OF THE DISCLOSURE

In general, one aspect disclosed features a system comprising: a processor; and a non-transitory machine-readable storage medium encoded with instructions executable by the processor, the machine-readable storage medium comprising instructions to cause the processor to perform a method comprising: receiving first data describing a radio-frequency environment experienced by a radio system of a vehicle; receiving second data describing responses of one or more occupants of the vehicle to audio produced by the radio system; correlating the responses of the one or more occupants of the vehicle with changes in the radio-frequency environment experienced by the radio system; and generating a code update using the correlation of the responses with the changes in the radio-frequency environment, and refreshing code stored in a memory of the vehicle according to the code update, wherein a processor in the vehicle executes the code.

Embodiments of the system may include one or more of the following features. In some embodiments, the method further comprises: receiving third data describing locations of the vehicle corresponding to the responses of the one or more occupants; correlating the responses, the changes in the radio-frequency environment, and the locations of the vehicle; and generating the code update using the correlation of the responses, the changes in the radio-frequency environment, and the locations of the vehicle. In some embodiments, the method further comprises: receiving the responses and the changes in the radio-frequency environment from a plurality of the vehicles; and correlating the responses with the changes in the radio-frequency environments; and generating the code update using the correlations of the responses with the changes in the radio-frequency environments, and refreshing the code stored in the memory of each vehicle according to the code update, and wherein the processor in each vehicle executes the respective code. In some embodiments, the method further comprises: receiving third data describing a type of each of the vehicles; and generating a respective code update for each of the types using the correlations of the responses with the changes in the radio-frequency environments, and refreshing the code stored in the memory of the vehicle according to the respective code update, and wherein the processor in each vehicle executes the respective code. In some embodiments, the method further comprises: receiving third data describing functions performed by the radio system in response to the changes in the radio-frequency environment experienced by the radio system; receiving fourth data describing responses, of the one or more occupants of the vehicle, to audio produced by the radio system in response to the functions performed by the radio system in response to the changes in the radio-frequency environment experienced by the radio system; correlating the responses, the changes in the radio-frequency environment, and the functions performed by the radio system; and generating the code update using the correlation of the responses, the changes in the radio-frequency environment, and the functions performed by the radio system, and refreshing the code stored in the memory of the vehicle according to the code update, wherein the processor in the vehicle executes the code. In some embodiments, the method further comprises: receiving fifth data describing the vehicle; correlating the responses, the changes in the radio-frequency environment, the functions performed by the radio system, and the data describing the vehicle; and generating the code update using the correlation of the responses, the changes in the radio-frequency environment, the functions performed by the radio system, and the data describing the vehicle.

In general, one aspect disclosed features a non-transitory machine-readable storage medium encoded with instructions executable by a hardware processor of a computing component, the machine-readable storage medium comprising instructions to cause the hardware processor to perform a method comprising: receiving first data describing a radio-frequency environment experienced by radio system of a vehicle; receiving second data describing responses of one or more occupants of the vehicle to audio produced by the radio system; correlating the responses of the one or more occupants of the vehicle with changes in the radio-frequency environment experienced by the radio system; and generating a code update using the correlation of the responses with the changes in the radio-frequency environment, and refreshing code stored in a memory of the vehicle according to the code update, wherein a processor in the vehicle executes the code.

Embodiments of the medium may include one or more of the following features. In some embodiments, the method further comprises: receiving third data describing locations of the vehicle corresponding to the responses of the one or more occupants; correlating the responses, the changes in the radio-frequency environment, and the locations of the vehicle; and generating the code update using the correlation of the responses, the changes in the radio-frequency environment, and the locations of the vehicle. In some embodiments, the method further comprises: receiving the responses and the changes in the radio-frequency environment from a plurality of the vehicles; correlating the responses with the changes in the radio-frequency environments; and generating the code update using the correlation of the responses with the changes in the radio-frequency environments, and refreshing code stored in the memory of each vehicle according to the respective code update, wherein the processor in each vehicle executes the respective code. In some embodiments, the method further comprises: receiving third data describing a type of each of the vehicles; and generating a respective code update for each of the types using the correlations of the responses with the changes in the radio-frequency environments, and refreshing the code stored in the memory of the vehicle according to the respective code update, wherein the processor in each vehicle executes the respective code. In some embodiments, the method further comprises: receiving third data describing functions performed by the radio system in response to the changes in the radio-frequency environment experienced by the radio system; receiving fourth data describing responses, of the one or more occupants of the vehicle, to audio produced by the radio system in response to the functions performed by the radio system in response to the changes in the radio-frequency environment experienced by the radio system; correlating the responses, the changes in the radio-frequency environment, and the functions performed by the radio system; and generating the code update using the correlation of the responses, the changes in the radio-frequency environment, and the functions performed by the radio system, and refreshing the code stored in the memory of the vehicle according to the code update, wherein the processor in the vehicle executes the code. In some embodiments, the method further comprises: receiving fifth data describing the vehicle; correlating the responses, the changes in the radio-frequency environment, the functions performed by the radio system, and the data describing the vehicle; and generating the code update using the correlation of the responses, the changes in the radio-frequency environment, the functions performed by the radio, and the data describing the vehicle.

In general, one aspect disclosed features a method comprising: receiving first data describing a radio-frequency environment experienced by a radio system of a vehicle, the vehicle radio system comprising a processor and a memory storing code executable by the processor; receiving second data describing responses of one or more occupants of the vehicle to audio produced by the radio system; correlating the responses of one or more occupants of the vehicle with changes in the radio-frequency environment experienced by the radio system; generating a code update using the correlation of the responses with changes in the radio-frequency environment experienced by the radio system, and refreshing code stored in a memory of the vehicle according to the code update, wherein a processor in the vehicle executes the code.

Embodiments of the method may include one or more of the following features. Some embodiments comprise receiving third data describing locations of the vehicle corresponding to the responses of the one or more occupants; correlating the responses, the changes in the radio-frequency environment, and the locations of the vehicle; and generating the code update using the correlation of the responses, the changes in the radio-frequency environment, and the locations of the vehicle. Some embodiments comprise changing a design of an antenna for the vehicle using (i) the correlation of the responses, the changes in the radio-frequency environment, and the locations of the vehicle, and (ii) a design of a current antenna of the vehicle. Some embodiments comprise receiving the responses and the changes in the radio-frequency environment from a plurality of the vehicles; correlating the responses with the changes in the radio-frequency environments; and generating the code update using the correlations of the responses with the changes in the radio-frequency environments, and refreshing the code stored in the memory of the vehicle according to the respective code update, wherein the processor in each vehicle executes the respective code. Some embodiments comprise receiving third data describing a type of each of the vehicles; and generating a respective code update for each of the types using the correlations of the responses with the changes in the radio-frequency environments, and refreshing the code stored in the memory of the vehicle according to the respective code update, wherein the processor in each vehicle executes the respective code. Some embodiments comprise changing a design of the antenna for the plurality of the vehicles using (i) the correlations of the responses with the changes in the radio-frequency environments, and (i) a design of a current antenna of the plurality of the vehicles. Some embodiments comprise receiving third data describing functions, performed by the radio system, in response to the changes in the radio-frequency environment experienced by the radio system; receiving fourth data describing responses, of the one or more occupants of the vehicle, to audio produced by the vehicle radio system in response to the functions performed by the radio system in response to the changes in the radio-frequency environment experienced by the radio system; correlating the responses, the changes in the radio-frequency environment, and the functions performed by the radio; and generating the code update using the correlation of the responses, the changes in the radio-frequency environment, and the functions performed by the radio, and refreshing the code stored in the memory of the vehicle according to the code update, wherein the processor in the vehicle executes the code. Some embodiments comprise receiving fifth data describing the vehicle; correlating the responses, the changes in the radio-frequency environment, the functions performed by the radio system, and the data describing the vehicle; and generating the code update using the correlation of the responses, the changes in the radio-frequency environment, the functions performed by the radio, and the data describing the vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Currently, vehicle radio-frequency audio systems including vehicle radios and antennas (collectively referred to herein as "vehicle radio systems") are designed and tuned during manufacture to suit customer preferences. These preferences are collected by customer surveys which may be conducted only every five years or so. The customer surveys indicate how customers would like the radio systems to react to conditions such as weak signals, interruptions, static, switching between analog and HD radio signals, and the like.

Various embodiments are directed to a system and method that monitors the RF environment of the vehicle radio systems, as well as responses to changes in the RF environment by a listener of audio produced by vehicle radio systems. For example, the listener may increase the volume for a weak channel.

The data is collected passively and automatically, with no interaction required of the vehicle occupants. Thus, the vehicle has the ability to self-monitor its radio systems, thereby providing more accurate performance data that can be received, and communicated to audio engineers, in a timely manner. This data is analyzed to optimize the vehicle radio systems, for example by modifying the signal reception hardware and software in the vehicle.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

In some embodiments, the data collected may be used to change the design of the vehicle antennas. The data collected may also or alternatively be used to change the software/firmware in the vehicle radio systems, for example to change the signal processing or radio operation. The data may be collected from a single vehicle, and used to optimize the audio experience for that vehicle or for an occupant identified as being in the vehicle when the data is collected. The data may be collected for a single listener, and used to optimize the audio experience for that listener.

In some embodiments, a big data approach may be employed by collecting large amounts of data from many vehicles of the same or different makes, models, and years, and in many locations, and using that data to train an analytics model. The model may be used to analyze data subsequently collected, and to optimize the vehicle radio systems accordingly.

Figure 1:
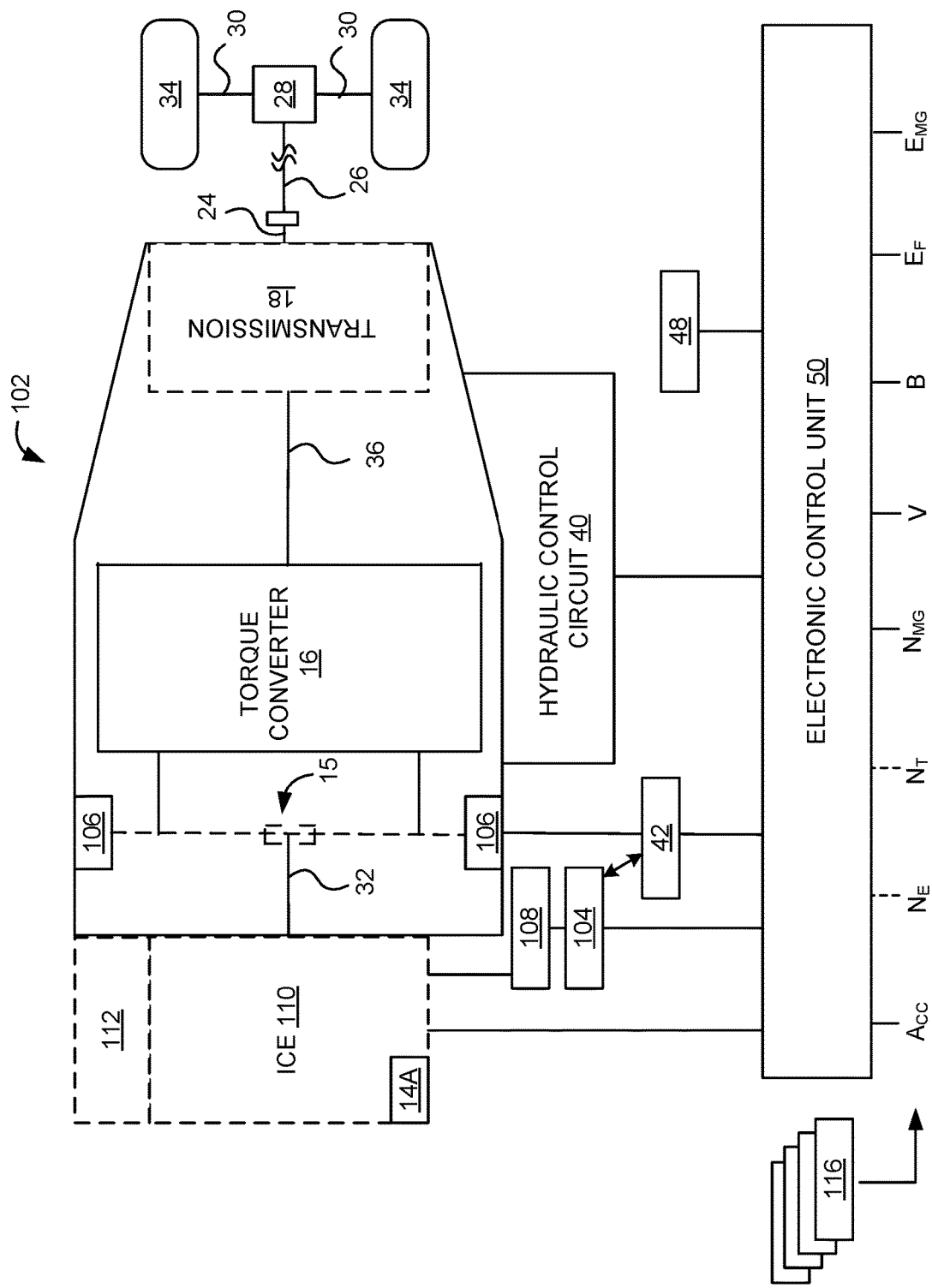
FIG. 1 illustrates an example vehicle in which embodiments of the disclosed technology may be implemented.

An example vehicle 102 in which embodiments of the disclosed technology may be implemented is illustrated in FIG. 1. The vehicle depicted in FIG. 1 is a hybrid electric vehicle. However, the disclosed technology is independent of the means of propulsion of the vehicle, and so applies equally to vehicles without an electric motor, and to vehicles without an internal combustion engine.

FIG. 1 illustrates a drive system of a vehicle 102 that may include an internal combustion engine 110 and one or more electric motors 106 (which may also serve as generators) as sources of motive power. Driving force generated by the internal combustion engine 110 and motor 106 can be transmitted to one or more wheels 34 via a torque converter 16, a transmission 18, a differential gear device 28, and a pair of axles 30.

As an HEV, vehicle 102 may be driven/powered with either or both of engine 110 and the motor(s) 106 as the drive source for travel. For example, a first travel mode may be an engine-only travel mode that only uses internal combustion engine 110 as the drive source for travel. A second travel mode may be an EV travel mode that only uses the motor(s) 106 as the drive source for travel. A third travel mode may be an HEV travel mode that uses engine 110 and the motor(s) 106 as drive sources for travel. In the engine-only and HEV travel modes, vehicle 102 relies on the motive force generated at least by internal combustion engine 110, and a clutch 15 may be included to engage engine 110. In the EV travel mode, vehicle 102 is powered by the motive force generated by motor 106 while engine 110 may be stopped and clutch 15 disengaged.

Engine 110 can be an internal combustion engine such as a spark ignition (SI) engine (e.g., gasoline engine) a compression ignition (CI) engine (e.g., diesel engine) or similarly powered engine (whether reciprocating, rotary, continuous combustion or otherwise) in which fuel is injected into and combusted to provide motive power. A cooling system 112 can be provided to cool the engine such as, for example, by removing excess heat from engine 110. For example, cooling system 112 can be implemented to include a radiator, a water pump and a series of cooling channels. In operation, the water pump circulates coolant through the engine to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 110. In other applications, either or both the water pump and the fan may be operated by electric current such as from battery 104.

An output control circuit 14A may be provided to control drive (output torque) of engine 110. Output control circuit 14A may include a throttle actuator to control an electronic throttle valve that controls fuel injection, an ignition device that controls ignition timing, and the like. Output control circuit 14A may execute output control of engine 110 according to a command control signal(s) supplied from an electronic control unit 50, described below. Such output control can include, for example, throttle control, fuel injection control, and ignition timing control.

Motor 106 can also be used to provide motive power in vehicle 102, and is powered electrically via a battery 104. Battery 104 may be implemented as one or more batteries or other power storage devices including, for example, lead-acid batteries, lithium ion batteries, capacitive storage devices, and so on. Battery 104 may be charged by a battery charger 108 that receives energy from internal combustion engine 110. For example, an alternator or generator may be coupled directly or indirectly to a drive shaft of internal combustion engine 110 to generate an electrical current as a result of the operation of internal combustion engine 110. A clutch can be included to engage/disengage the battery charger 108. Battery 104 may also be charged by motor 106 such as, for example, by regenerative braking or by coasting during which time motor 106 operate as generator.

Motor 106 can be powered by battery 104 to generate a motive force to move the vehicle and adjust vehicle speed. Motor 106 can also function as a generator to generate electrical power such as, for example, when coasting or braking. Battery 104 may also be used to power other electrical or electronic systems in the vehicle. Motor 106 may be connected to battery 104 via an inverter 42. Battery 104 can include, for example, one or more batteries, capacitive storage units, or other storage reservoirs suitable for storing electrical energy that can be used to power motor 106. When battery 104 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 106, and adjust the current received from motor 106 during regenerative coasting and breaking. As a more particular example, output torque of the motor 106 can be increased or decreased by electronic control unit 50 through the inverter 42.

A torque converter 16 can be included to control the application of power from engine 110 and motor 106 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 110 from the drivetrain of the vehicle. In the illustrated example, a crankshaft 32, which is an output member of engine 110, may be selectively coupled to the motor 106 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 110 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 110 (engine RPM), a rotational speed, $N_{MS}$, of the motor 106 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 104 detected by an SOC sensor). Accordingly, vehicle 102 can include a plurality of sensors 116 that can be used to detect various conditions internal or external to the vehicle and provide sensed conditions to engine control unit 50 (which, again, may be implemented as one or a plurality of individual control circuits). In one embodiment, sensors 116 may be included to detect one or more conditions directly or indirectly such as, for example, fuel efficiency, $E_F$, motor efficiency, $E_{MG}$, hybrid (internal combustion engine 110+MG 12) efficiency, etc.

In some embodiments, one or more of the sensors 116 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 116 may provide an analog output or a digital output.

Sensors 116 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, the presence or absence of a road shoulder and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
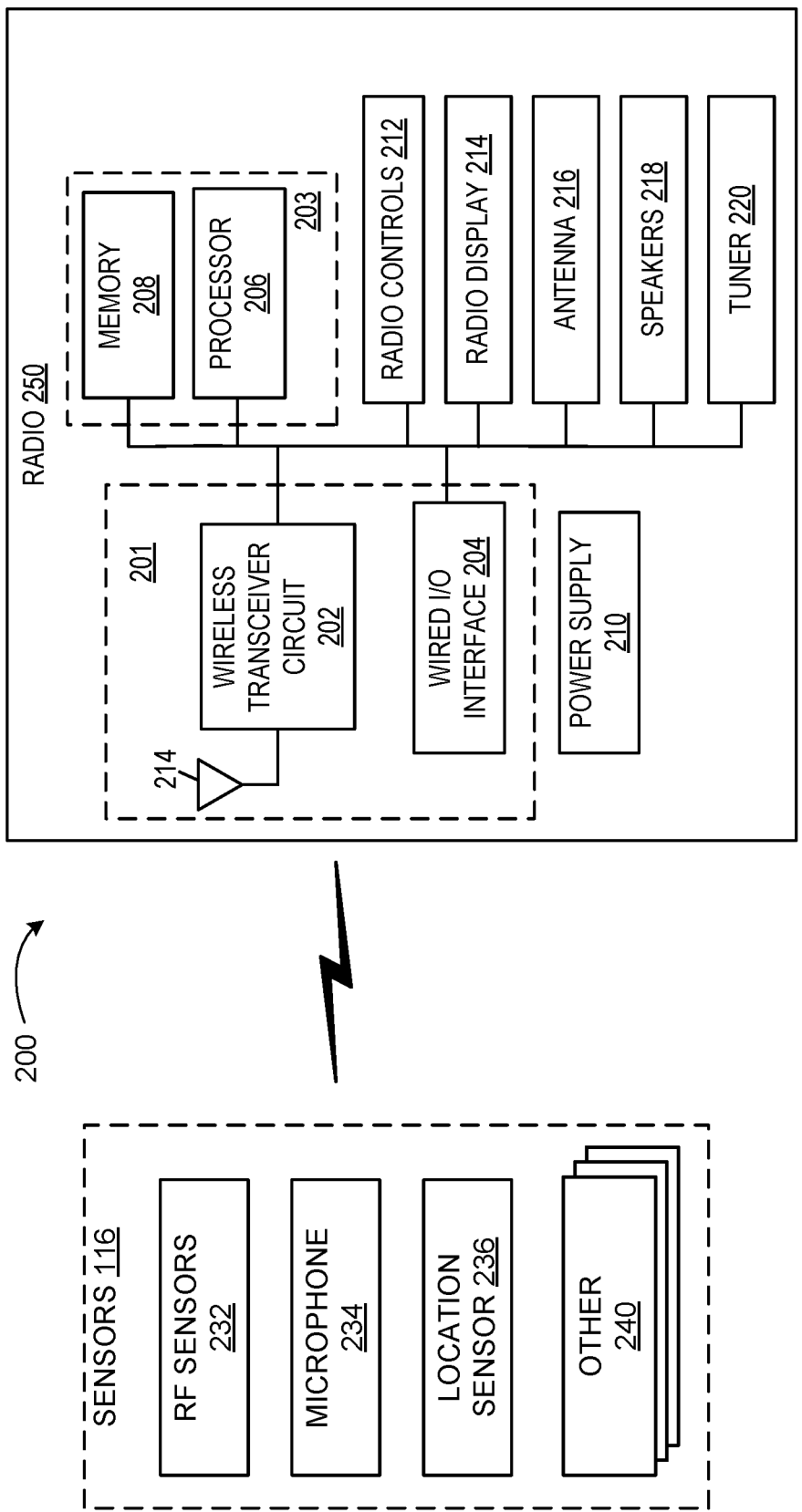
FIG. 2 illustrates an example architecture for automatic optimization of a vehicle radio system in accordance with one embodiment

FIG. 2 illustrates an example architecture for automatic optimization of vehicle radio systems in accordance with one embodiment of the systems and methods described herein. Referring now to FIG. 2, in this example, a vehicle 200 includes a radio system 250, and a plurality of sensors 116. Sensors 116 can communicate with radio system 250 via a wired or wireless communication interface. Although sensors 116 are depicted as communicating with radio system 250, they can also communicate with each other as well as with other vehicle systems. Radio system 250 can be implemented as an ECU or as part of an ECU such as, for example electronic control unit 50. In other embodiments, radio system 250 can be implemented independently of the ECU.

Radio system 250 in this example includes a communication circuit 201, a processing circuit 203 (including a processor 206 and memory 208 in this example) and a power supply 210. The memory 208 may store code executable by the processor 206. Components of radio system 250 are illustrated as communicating with each other via a data bus, although other communication interfaces can be included. Radio system 250 in this example also includes radio controls 212, a radio display 214, an antenna 216, speakers 218, and a tuner 220. The radio controls 212 can be operated by the user to control the radio system 250, for example by manual controls, voice, and the like. The radio display 214 can display information such as the frequency band and frequency of the radio station tuned by the radio system 250, the volume of the radio system 250, equalization parameters employed by an amplifier of the radio system 250, and the like.

Processor 206 can include a GPU, CPU, microprocessor, or any other suitable computing component. One example computing component is described below with reference to FIG. 5. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to radio system 250.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a radio system 250.

Communication circuit 201 includes either or both a wireless transceiver circuit 202 with an associated antenna 214 and a wired I/O interface 204 with an associated hardwired data port (not illustrated). As this example illustrates, communications with radio system 250 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by radio system 250 to/from other entities such as sensors 116.

Wired I/O interface 204 can include a transmitter and a receiver (not shown) for hardwired communications with other devices. For example, wired I/O interface 204 can provide a hardwired interface to other components, including sensors 116. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, $NiH_2$, rechargeable, primary battery, etc.), a power connector (e.g., to connect to vehicle supplied power, etc.), an energy harvester (e.g., solar cells, piezoelectric system, etc.), or include any other suitable power supply.

Sensors 116 may include additional sensors that may or not otherwise be included on a standard vehicle 102 with which the radio system 250 is implemented. In the illustrated example, sensors 116 include RF sensors 232, one or more microphones 234, and a location sensor 236. The RF sensors 232 may include any sensor capable of performing the functions described herein. The location sensor 236 may include a global positioning system (GPS) circuit or the like, and may be embodied in or as part of a vehicle navigation system, or as a standalone component/system. Additional sensors 232 can also be included as may be appropriate for a given implementation of radio system 250.

During operation, radio system 250 can receive information from various vehicle sensors. Communication circuit 201 can be used to transmit and receive information between radio system 250 and sensors 116. In various embodiments, communication circuit 201 can be configured to receive data and other information from sensors 116. Examples of this are described in more detail below.

Figure 3:
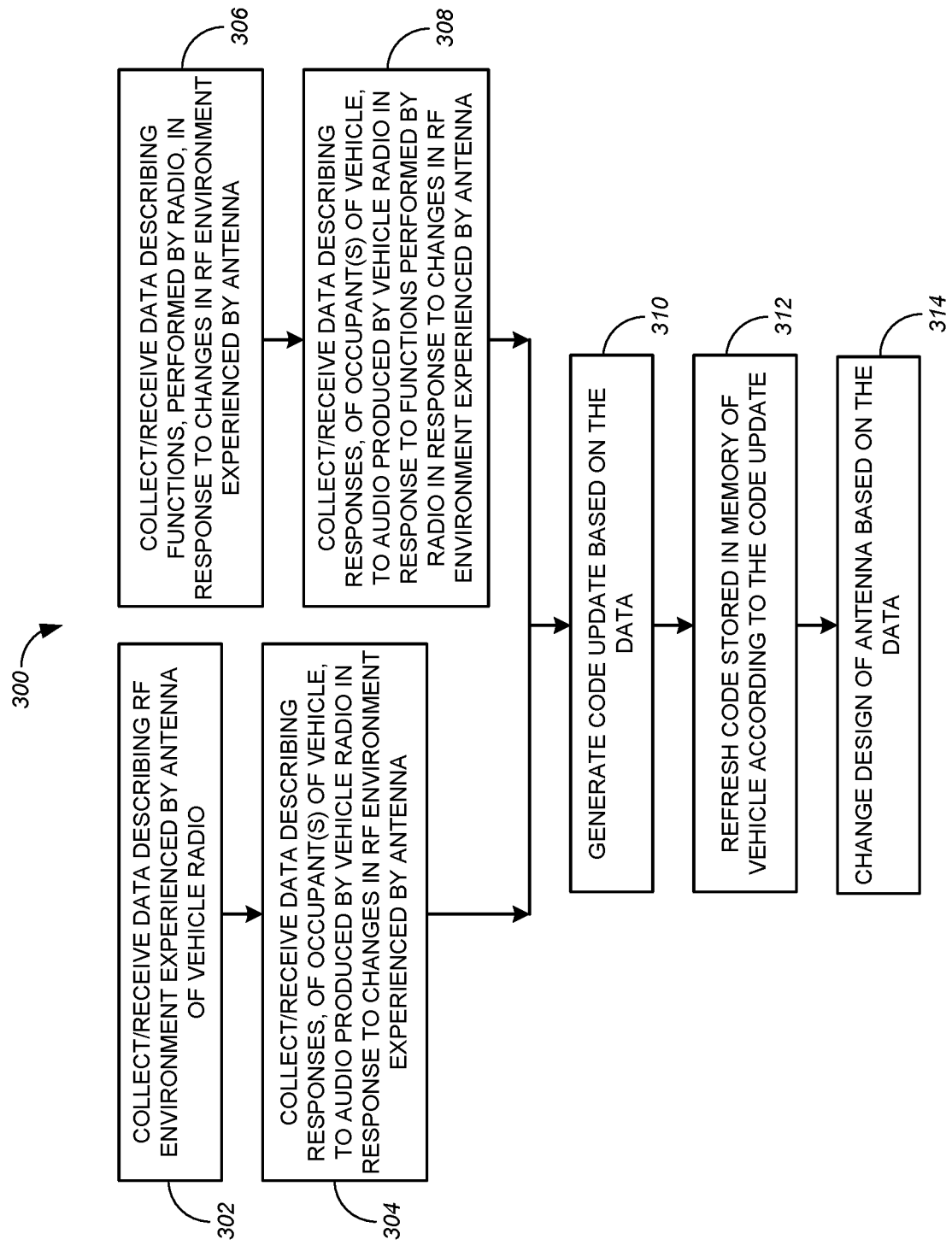
FIG. 3 is a flowchart illustrating a process for automatic optimization of a vehicle radio system according to one embodiment.

In some embodiments, a vehicle optimizes its own radio system. FIG. 3 is a flowchart illustrating a process 300 for automatic optimization of a vehicle radio system according to one embodiment. While the steps of the process 300 are described in a particular order for this embodiment, in other embodiments steps may be performed in other sequences, concurrently, and the like.

Referring to FIG. 3, a vehicle 102 collects data describing the radio-frequency environment experienced by the radio system 250 of the vehicle radio system 250, at 302. This data may be provided by RF sensors 232, by radio system 250, by other sensors in the vehicle 102, or by any combination thereof. This data may include the signal strength of signal(s) received by the antenna 216, the signal-to-noise ratios of the signals received by the antenna 216, the frequencies of radio stations tuned by the radio system 250, and the like. The signal strengths and signal-to-noise ratios may be provided by RF sensors 232, by the radio system 250, or by other sensors. The frequencies of radio stations tuned by the radio system 250 may be reported by the tuner 220 for the radio system 250. This data may be received by a computing component in the vehicle 102. The computing component may be implemented as part of the electronic control unit of FIG. 1, as the processing circuit 203 of FIG. 2, elsewhere in the vehicle 102, or any combination thereof. One example computing component is described below with reference to FIG. 5.

Referring again to FIG. 3, the vehicle 102 may collect/receive data describing a radio-frequency environment experienced by the radio system 250, at 302. The vehicle 102 may also collect data describing responses, of one or more occupants of the vehicle 102, to audio produced by the vehicle radio system 250, at 304. The responses of the occupant(s) may include operation of the radio controls 212 of the radio system 250 by the occupant(s), speech of the occupant(s), and the like. The vehicle 102 may correlate the responses of the occupant(s) with changes in the radio-frequency environment experienced by the radio system 250, at 306. For example, in response to audio produced by the radio system 250 in response to a weakening radio signal, an occupant may increase the volume of radio system 250 or tune radio system 250 to a different radio station. The data may also describe the locations of the vehicle 102 corresponding to the responses of the one or more occupants. That is, the data may describe a location of the vehicle 102 when each of the occupant responses took place. This data may be collected by radio system 250, microphone 234, and/or location sensor 236. This data may be received by a computing component in the vehicle 102.

The vehicle 102 may collect/receive data describing functions, performed by the radio system 250, in response to the changes in the radio-frequency environment experienced by the radio system 250, at 308. For example, in response to a weakening radio signal, the radio system 250 may implement the function of changing from high definition (HD) radio processing to analog radio processing. This data may be collected by radio system 250. This data may be received by a computing component in the vehicle 102.

The vehicle 102 may collect data describing responses, of the one or more occupants of the vehicle 102, to audio produced by the vehicle radio system 250, at 310. The responses of the occupant(s) may include operation of the radio controls 212 of the radio system 250 by the occupant(s), speech of the occupant(s), and the like. The vehicle 102 may correlate the responses, the functions performed by the radio system 250 in response to the changes in the radio-frequency environment experienced by the radio system 250, and the changes in the radio-frequency environment experienced by the radio system 250, at 312. For example, in response to the radio system 250 implementing the function of changing from HD radio processing to analog radio processing, an occupant of the vehicle 102 may tune to a different radio station or turn off the radio system 250. This data may be collected by radio system 250, microphone 234, or both. This data may be received by a computing component in the vehicle 102.

The vehicle 102 may generate a code update using one or more of the correlations, at 314. The code update is used to refresh the code stored in the memory 208 of the vehicle 102. Refreshing the code with the code update may include modifying existing algorithms, parameters, and the like, for the code to be updated. The code update may be generated by processor 206 using data stored in memory 208, which may be collected from sensors 116, radio system 250, and other systems within the vehicle 102.

For example, the processor 206 may execute a code generator. The code generator may access the memory 208 to obtain the data, and categorize the data according to the components of the vehicle 102 that could be affected. The code generator may analyze all data in each category to generate the code update.

The code update may be generated using particular responses of occupants of the vehicle to audio produced by the vehicle radio system 250 in response to changes in the RF environment experienced by the radio system 250. For example, if an occupant tuned to a different radio station in response to audio produced by the radio 254 for a weakening radio signal, the code update may implement different processing for weakening radio signals at that frequency. A computing component in the vehicle, for example such as the processor 206 of the radio system 250, executes the code.

The radio system 250 may perform functions in response to the changes in the radio-frequency environment experienced by the radio system 250. The vehicle radio system 250 may produce audio in response to the performed functions. The code update may be generated using particular responses of the one or more occupants of the vehicle 102 to the audio. For example, if an occupant tunes to a different radio station in response to audio produced by the radio when changing from HD processing to analog processing, the code update may change a signal strength threshold used to trigger the change from HD processing to analog processing.

The code update may be generated using the locations of the vehicle 102. For example, the locations may be used in conjunction with a signal strength map to determine whether the data describing the RF environment experienced by the radio system 250 has been affected by a poor signal environment, for example attributable to difficult geographic conditions.

The vehicle 102 may update the code stored in the memory 208 of the vehicle 102 according to the code update, at 316. Any method of refreshing the code may be employed. For example, the code or portions of the code may be modified, replaced, augmented, and the like.

In some embodiments, parts of process 300 may be implemented outside the vehicle, for example at a remote server, in the cloud, and the like. For example, the data collected during process 300 may be transmitted to a remote server. In such embodiments, the remote server generates the code update, and transmits the code update to the vehicle 102. The vehicle 102 then updates the code stored in the memory 208 of the radio system 250.

In some embodiments, one or more of the correlations may be used to change a design of the vehicle antenna 216, at 318. That is, the current design of the antenna 216 may be changed or replaced. In such embodiments, some or all of the data collected and/or generated during process 300 is transmitted to a remote server. The data transmitted may also include data describing the vehicle 102, for example such as make, model, model year, vehicle identification number, and the like.

Figure 4:
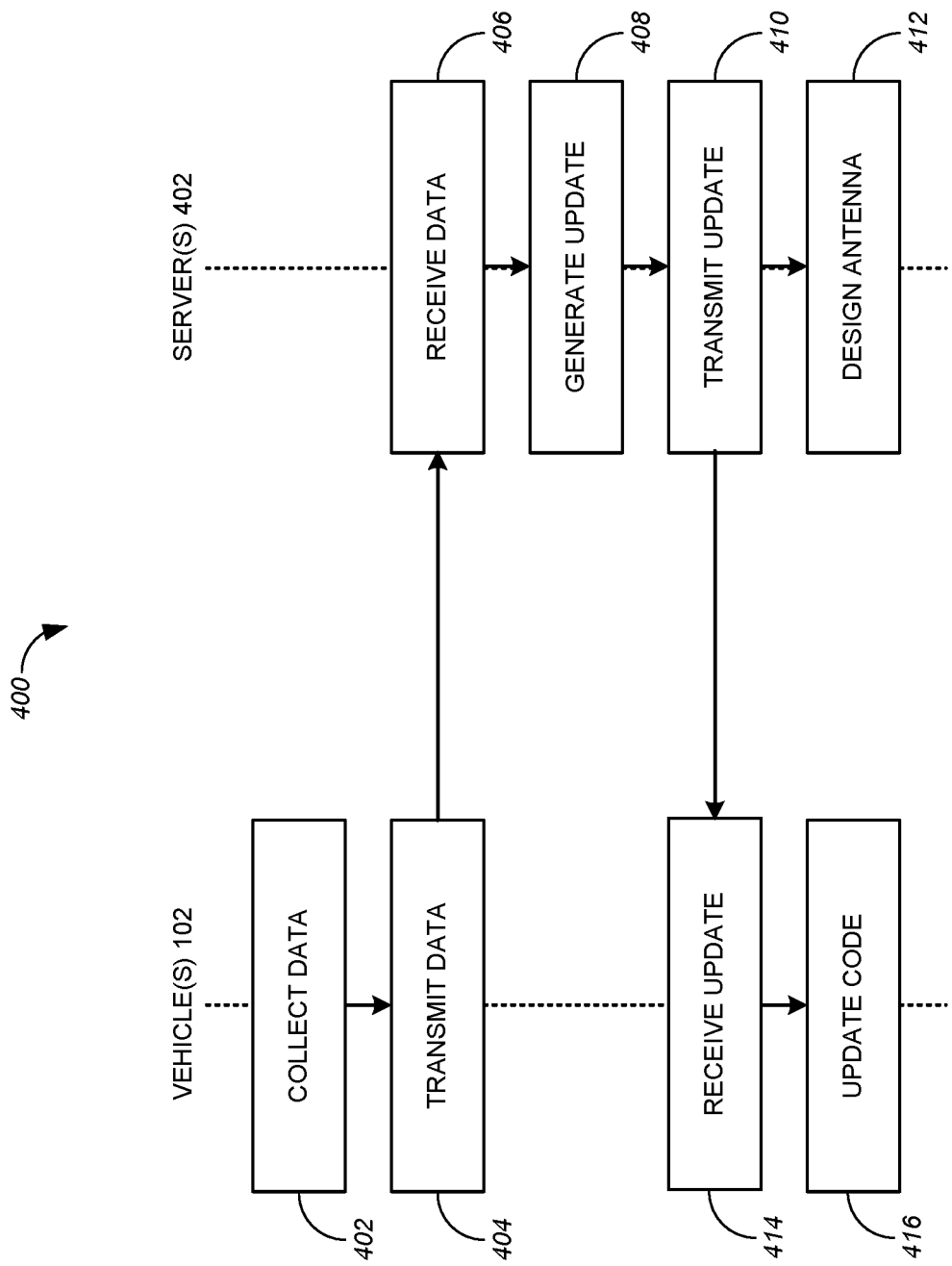
FIG. 4 is a flowchart illustrating a process for automatic optimization of vehicle radio systems using the cloud according to one embodiment.

FIG. 4 is a flowchart illustrating a process 400 for automatic optimization of vehicle radio systems using the cloud according to one embodiment. In this description, the cloud is described in terms of computing components such as one or more remote servers 402, that is, servers 402 located remotely from the vehicle 102. While the steps of the process 400 are described in a particular order for this embodiment, and other embodiments steps may be performed in other sequences, concurrently, and the like.

This process 400 may be used to optimize vehicle radio systems for a single vehicle, or for a group of vehicles 102. The group of vehicles 102 may include all of the vehicles 102 produced by a particular vehicle manufacturer, or a subset of vehicles produced by that manufacturer, for example selected by model, model year, and the like, or combinations thereof. While this process 400 is applicable to a single vehicle 102 and/or a single server 402, for clarity of description, this process 400 will be described for multiple vehicles 102 and multiple servers 402.

Referring to FIG. 4, vehicles 102 collect data, for example such as the data described above, at 402. In some embodiments, the data may describe the radio-frequency environments experienced by the radio systems 250. In some embodiments, the data may also describe responses, of one or more occupants of the vehicles 102, to audio produced by the vehicle radio systems 250 in response to changes in the radio-frequency environment experienced by the radio systems 250. In such embodiments, the data may also describe the locations of the vehicles 102 corresponding to the responses of the one or more occupants. That is, the data may describe locations of the vehicles 102 when each of the occupant responses took place. This data may be collected by radio system 250, microphone 234, and/or location sensor 236. The data may also describe the vehicles 102, for example by describing a type of each vehicle. The type may indicate make, model, model year, and the like.

In some embodiments, the data may describe functions, performed by the radio systems 250, in response to the changes in the radio-frequency environment experienced by the radio systems 250. In such embodiments, the data may describe responses, of the one or more occupants of the vehicles 102, to audio produced by the vehicle radio systems 250 in response to the functions performed by the radio systems 250 in response to the changes in the radio-frequency environments experienced by the radio systems 250. The data may also describe the vehicles 102.

The vehicles 102 transmit the data to the servers 402, at 404. Any method of transmission may be employed. For example, the vehicles 102 may transmit the data wirelessly to roadside receivers or transceivers. The servers 402 receive the data, at 406.

The servers 402 generate one or more code updates using the received data, at 408, for example as described above. In some embodiments, one code update is generated for all of the vehicles 102. In other embodiments, a different code update is generated for each type of vehicle 102. In still other embodiments, a different code update is generated for each vehicle 102.

In some embodiments, the servers 402 may run specified algorithms in a cloud server infrastructure, and be configured to train and improve the algorithms used to generate the code updates. The algorithms use data collected from a multitude of vehicles (i.e., a Big Data approach), to optimize the algorithms in a way not possible with data provided by only a single vehicle 102. Big Data may typically include data sets with sizes beyond the ability of commonly used software tools to capture, curate, manage, and process data within a tolerable elapsed time. Big data size may be a constantly moving target, but can range from a few dozen terabytes to many petabytes of data. Big data may include a set of techniques and technologies that require new forms of integration to uncover large hidden values from large datasets that are diverse, complex, and of a massive scale.

The algorithms may be trained using a training dataset as each data point gathered from the multitude of vehicles is fed into the current algorithm and compared with a desired outcome. If the outcome deviates, the parameters of the algorithms are changed slightly through a statistical optimization calculation to improve the outcome. After each iteration of the training set the algorithm is evaluated using a test set. This process is repeated until the overall algorithm demonstrates improved performance.

The code update(s) are transmitted to the vehicles 102, at 410. The vehicles 102 receive the code updates, at 414. That is, each vehicle 102 receives the code update intended for that vehicle 102. Any method of transmission may be employed. Each vehicle 102 receiving a code update updates the code stored in the memory 208 of its radio system 250, at 416. A computing component in the vehicle, for example such as the processor 206 of the radio system 250, executes the code.

In some embodiments, some or all of the data collected during process 400 is used to change a design of the vehicle antenna 216, at 412. That is, the current design of the antenna 216 may be changed or replaced. For example, if the data indicates unusually weak radio signals at a particular frequency, the design of the antenna 216 can be modified to increase sensitivity at that frequency. As another example, for a vehicle with multiple antennas 216 or antenna elements, such as a diversity antenna, the method of blending the signals provided by the antennas 216 or antenna elements can be changed. In some embodiments, one antenna is designed/refined for all of the vehicles 102. In other embodiments, different antennas are designed/refined for each type of vehicle 102. In still other embodiments, different antennas are designed/refined for each vehicle 102.

In some embodiments, the big data approach described above for generating code updates may be used to generate the new antenna designs or refinements. The servers 402 may run specified algorithms in a cloud server infrastructure, and be configured to train and improve the algorithms used to generate the new antenna designs or refinements. The algorithms use data collected from a multitude of vehicles, to optimize the algorithms in a way not possible with data provided by only a single vehicle 102. The algorithms may produce data indicative of new antenna designs, modifications and refinements to existing antenna designs, expected performance improvements, and the like.

Figure 5:
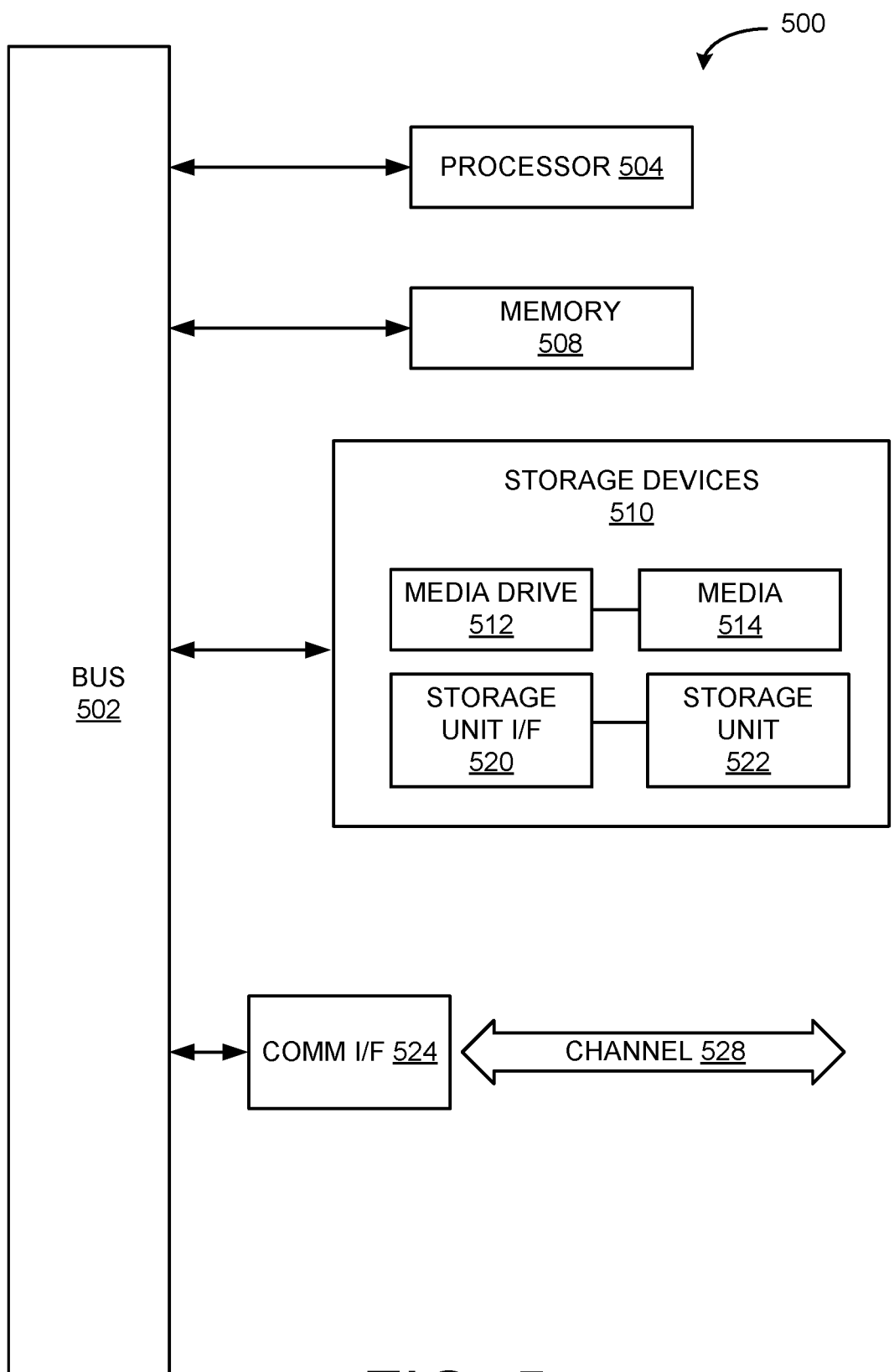
FIG. 5. shows an example computing component capable of carrying out the functionality described with respect thereto.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up hybrid vehicle 102 and its component parts, for example such as the computing component. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "machine-readable storage medium," "computer program medium," and "computer usable medium" are used to generally refer to media such as e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
   a processor; and
   a non-transitory machine-readable storage medium encoded with instructions executable by the processor, the machine-readable storage medium comprising instructions to cause the processor to perform a method comprising:
   receiving first data describing a radio-frequency environment experienced by a radio system of a vehicle;
   receiving second data describing responses of one or more occupants of the vehicle to audio produced by the radio system;
   correlating the responses of the one or more occupants of the vehicle with changes in the radio-frequency environment experienced by the radio system; and
   generating a code update using the correlation of the responses with the changes in the radio-frequency environment, and refreshing code stored in a memory of the vehicle according to the code update, wherein a processor in the vehicle executes the code.

2. The system of claim 1, wherein the method further comprises:
   receiving third data describing locations of the vehicle corresponding to the responses of the one or more occupants;
   correlating the responses, the changes in the radio-frequency environment, and the locations of the vehicle; and
   generating the code update using the correlation of the responses, the changes in the radio-frequency environment, and the locations of the vehicle.

3. The system of claim 1, wherein the method further comprises:
   receiving the responses and the changes in the radio-frequency environment from a plurality of the vehicles;
   correlating the responses with the changes in the radio-frequency environments; and
   generating the code update using the correlations of the responses with the changes in the radio-frequency environments, and refreshing the code stored in the memory of each vehicle according to the code update, and wherein the processor in each vehicle executes the respective code.

4. The system of claim 3, wherein the method further comprises:
   receiving third data describing a type of each of the vehicles; and
   generating a respective code update for each of the types using the correlations of the responses with the changes in the radio-frequency environments, and refreshing the code stored in the memory of the vehicle according to the respective code update, and wherein the processor in each vehicle executes the respective code.

5. The system of claim 1, wherein the method further comprises:
   receiving third data describing functions performed by the radio system in response to the changes in the radio-frequency environment experienced by the radio system;
   receiving fourth data describing responses, of the one or more occupants of the vehicle, to audio produced by the radio system in response to the functions performed by the radio system in response to the changes in the radio-frequency environment experienced by the radio system;
   correlating the responses, the changes in the radio-frequency environment, and the functions performed by the radio system; and
   generating the code update using the correlation of the responses, the changes in the radio-frequency environment, and the functions performed by the radio system, and refreshing the code stored in the memory of the vehicle according to the code update, wherein the processor in the vehicle executes the code.

6. The system of claim 5, wherein the method further comprises:
   receiving fifth data describing the vehicle;
   correlating the responses, the changes in the radio-frequency environment, the functions performed by the radio system, and the data describing the vehicle; and
   generating the code update using the correlation of the responses, the changes in the radio-frequency environment, the functions performed by the radio system, and the data describing the vehicle.

7. A non-transitory machine-readable storage medium encoded with instructions executable by a hardware processor of a computing component, the machine-readable storage medium comprising instructions to cause the hardware processor to perform a method comprising:
   receiving first data describing a radio-frequency environment experienced by radio system of a vehicle;
   receiving second data describing responses of one or more occupants of the vehicle to audio produced by the radio system;
   correlating the responses of the one or more occupants of the vehicle with changes in the radio-frequency environment experienced by the radio system; and
   generating a code update using the correlation of the responses with the changes in the radio-frequency environment, and refreshing code stored in a memory of the vehicle according to the code update, wherein a processor in the vehicle executes the code.

8. The medium of claim 7, wherein the method further comprises:
   receiving third data describing locations of the vehicle corresponding to the responses of the one or more occupants;
   correlating the responses, the changes in the radio-frequency environment, and the locations of the vehicle; and
   generating the code update using the correlation of the responses, the changes in the radio-frequency environment, and the locations of the vehicle.

9. The medium of claim 7, wherein the method further comprises:
   receiving the responses and the changes in the radio-frequency environment from a plurality of the vehicles;
   correlating the responses with the changes in the radio-frequency environments; and
   generating the code update using the correlation of the responses with the changes in the radio-frequency environments, and refreshing code stored in the memory of each vehicle according to the respective code update, wherein the processor in each vehicle executes the respective code.

10. The medium of claim 9, wherein the method further comprises:
    receiving third data describing a type of each of the vehicles; and
    generating a respective code update for each of the types using the correlations of the responses with the changes in the radio-frequency environments, and refreshing the code stored in the memory of the vehicle according to the respective code update, wherein the processor in each vehicle executes the respective code.

11. The medium of claim 7, wherein the method further comprises:
receiving third data describing functions performed by the radio system in response to the changes in the radio-frequency environment experienced by the radio system;
receiving fourth data describing responses, of the one or more occupants of the vehicle, to audio produced by the radio system in response to the functions performed by the radio system in response to the changes in the radio-frequency environment experienced by the radio system;
correlating the responses, the changes in the radio-frequency environment, and the functions performed by the radio system; and
generating the code update using the correlation of the responses, the changes in the radio-frequency environment, and the functions performed by the radio system, and refreshing the code stored in the memory of the vehicle according to the code update, wherein the processor in the vehicle executes the code.

12. The medium of claim 11, wherein the method further comprises:
receiving fifth data describing the vehicle;
correlating the responses, the changes in the radio-frequency environment, the functions performed by the radio system, and the data describing the vehicle; and
generating the code update using the correlation of the responses, the changes in the radio-frequency environment, the functions performed by the radio, and the data describing the vehicle.

13. A method comprising:
receiving first data describing a radio-frequency environment experienced by a radio system of a vehicle, the vehicle radio system comprising a processor and a memory storing code executable by the processor;
receiving second data describing responses of one or more occupants of the vehicle to audio produced by the radio system;
correlating the responses of one or more occupants of the vehicle with changes in the radio-frequency environment experienced by the radio system;
generating a code update using the correlation of the responses with changes in the radio-frequency environment experienced by the radio system, and refreshing code stored in a memory of the vehicle according to the code update, wherein a processor in the vehicle executes the code.

14. The method of claim 13, wherein the method further comprises:
receiving third data describing locations of the vehicle corresponding to the responses of the one or more occupants;
correlating the responses, the changes in the radio-frequency environment, and the locations of the vehicle; and
generating the code update using the correlation of the responses, the changes in the radio-frequency environment, and the locations of the vehicle.

15. The method of claim 14, wherein the method further comprises:
changing a design of an antenna for the vehicle using (i) the correlation of the responses, the changes in the radio-frequency environment, and the locations of the vehicle, and (ii) a design of a current antenna of the vehicle.

16. The method of claim 13, wherein the method further comprises:
receiving the responses and the changes in the radio-frequency environment from a plurality of the vehicles;
correlating the responses with the changes in the radio-frequency environments; and
generating the code update using the correlations of the responses with the changes in the radio-frequency environments, and refreshing the code stored in the memory of the vehicle according to the respective code update, wherein the processor in each vehicle executes the respective code.

17. The method of claim 16, wherein the method further comprises:
receiving third data describing a type of each of the vehicles; and
generating a respective code update for each of the types using the correlations of the responses with the changes in the radio-frequency environments, and refreshing the code stored in the memory of the vehicle according to the respective code update, wherein the processor in each vehicle executes the respective code.

18. The method of claim 16, wherein the method further comprises:
changing a design of the antenna for the plurality of the vehicles using (i) the correlations of the responses with the changes in the radio-frequency environments, and (i) a design of a current antenna of the plurality of the vehicles.

19. The method of claim 13, wherein the method further comprises:
receiving third data describing functions, performed by the radio system, in response to the changes in the radio-frequency environment experienced by the radio system;
receiving fourth data describing responses, of the one or more occupants of the vehicle, to audio produced by the vehicle radio system in response to the functions performed by the radio system in response to the changes in the radio-frequency environment experienced by the radio system;
correlating the responses, the changes in the radio-frequency environment, and the functions performed by the radio; and
generating the code update using the correlation of the responses, the changes in the radio-frequency environment, and the functions performed by the radio, and refreshing the code stored in the memory of the vehicle according to the code update, wherein the processor in the vehicle executes the code.

20. The method of claim 19, wherein the method further comprises:
receiving fifth data describing the vehicle;
correlating the responses, the changes in the radio-frequency environment, the functions performed by the radio system, and the data describing the vehicle; and
generating the code update using the correlation of the responses, the changes in the radio-frequency environment, the functions performed by the radio, and the data describing the vehicle.

* * * * *